United States Patent [19]

Dührkoop

[11] Patent Number: 4,878,761

[45] Date of Patent: Nov. 7, 1989

[54] DEVICE FOR DETECTING EXCESSIVELY HEATED WHEEL BEARINGS AND/OR WHEEL TIRES

[75] Inventor: Jens Dührkoop, Heidelberg, Fed. Rep. of Germany

[73] Assignee: Voest-Alpine AG, Linz, Austria

[21] Appl. No.: 110,521

[22] Filed: Oct. 16, 1987

[30] Foreign Application Priority Data

Oct. 17, 1986 [AT] Austria .................................. 2771/86

[51] Int. Cl.⁴ ............................. B61L 3/06; G01J 5/10
[52] U.S. Cl. ................................ 374/124; 246/169 D; 246/DIG. 2; 374/130; 374/132; 340/44 G
[58] Field of Search ............................ 374/124; 356/43; 246/DIG. 1, DIG. 2, 249, 169 A, 169 D

[56] References Cited

U.S. PATENT DOCUMENTS

| 2,131,328 | 9/1938 | Michelssen | 246/DIG. 1 |
| 2,978,589 | 4/1961 | Howell | 374/112 |
| 3,461,284 | 8/1969 | Joy | 374/132 X |
| 3,998,549 | 12/1976 | Pusch et al. | 374/129 |
| 4,659,043 | 4/1987 | Gallagher | 246/DIG. 2 X |

FOREIGN PATENT DOCUMENTS 2907945  9/1980  Fed. Rep. of Germany .

OTHER PUBLICATIONS

"Industrial High Speed", W. S. Gorrill, pp. 112-114, Electronics Mar., 1949.

Primary Examiner—Daniel M. Yasich
Attorney, Agent, or Firm—Peter E. Rosden

[57] ABSTRACT

In the case of a system for detecting excessively heated wheel bearings and/or wheel tires of rail vehicles, a device is inserted into the path of the beam extending from a measuring point to a heat radiation sensor that distorts the resulting image and, in particular, widens it at least uniaxially. This device also serves to detect the measuring point when wheel axles shift in an axial direction. A system of this type may be formed by using a distorting optical device (6) which permits the imaging of a correspondingly widened field (4).

22 Claims, 3 Drawing Sheets

DEVICE FOR DETECTING EXCESSIVELY HEATED WHEEL BEARINGS AND/OR WHEEL TIRES

The invention relates to a system for detecting excessively heated wheel bearings and/or wheel tires of rail vehicles having a heat radiation sensor that is a stationarily arranged in the track area.

A system of the afore-mentioned type is shown, for example, in a West German patent application by Braun, et al. published on Sep. 4, 1980, DE-OS 29 07 945 where cooled detectors are used as the heat radiation sensors. In addition to the detectors that function in a conventionally thermal way (such as bolometers), there is a group of rapidly responding heat radiation sensors, such as HgCd, HgTe, InSb, PbSe or combinations of similar semiconductors. Semiconductor detectors of this type respond rapidly to changes of radiation and are not suitable for the continuous detection of a certain temperature level without any additional devices, such as modulators, which cyclically interrupt the incident beam.

Systems of this type are usually arranged in the track area, and the measuring beam reaches the cooled detector either along a vertical path or in a direction deviating from the vertical line through a window of the apparatus and corresponding deflection devices.

The wheels of railroad cars have slightly conical wheel running treads, and the distance of the wheel flanges from one another is less than the gauge. This results in a so-called sinusoidal path of the wheels which causes an axial shifting of the wheel axles corresponding to a sinusoidal oscillation. Since the measuring angle of known devices is relatively small in order to ensure corresponding sensitivity, a different point of the wheel bearing is used as the measuring point, relative to the bearing housing, where axles follows one another sequentially. Since heat radiated by individual parts of the wheel bearings may differ in axial direction in the case of unduly heated wheel bearings, reproducible data cannot be obtained without difficulty, especially due to the sinusoidal path of the wheels and thus of the bearings.

The invention has the objective of further enhancing a system of the afore-mentioned type so that, in the case of a selected setting, deviations of the measuring point occurring as a result of the sinusoidal path of the wheels, can be detected reliably. In order to achieve this objective, the system according to the invention uses a device inserted into the path of the beam from the measuring point to the heat radiation sensor that distorts the image and, more specifically, widens it at least uniaxially. As the result of the fact that a device is inserted that distorts the image, the cone of vision of the detector can be widened and reliable measuring of the hottest points of the bearing is also ensure in the case of a shifting of the axle corresponding to the sinusoidal path of the wheels. Widening of the cone of vision facilitates the adjustment of the device and also makes it possible to reliably scan different bearing constructions over the appropriate axial length at which maximum heating would occur in the case of a defective bearing. This type of an image-distorting device can be implemented through various different constructions. In order not to significantly reduce the sensitivity of the device, a uniaxial distortion is used in which the cone of vision is widened in the axial direction of the wheel axles but may be set to be relatively narrow in the axial direction in which the train moves. Naturally, this cone widening has the effect that areas with less heating are also measured, but the resulting sensitivity, in the case of a uniaxial widening of the cone of vision, is clearly acceptable when correspondingly sensitive detectors or sensors are employed. The resulting advantage of reliable detection of hot points even when axial shifting of the hottest point occurs due, for example, to the sinusoidal path of the wheels, in every case, outweighs the disadvantage of the slightly lower sensitivity.

A particularly uncomplicated device for uniaxial widening of the image can be obtained if the distorting device is constructed using an oscillating mirror. The axis of rotation of an oscillating mirror of this type must cross the axles of the wheels in order to achieve a uniaxial widening over the length of the bearings. Particularly in the case of rapidly moving trains having a speed, for example, in the range of approximately 350 km/h, only about 3 msec. are available for scanning a bearing, the external dimension measurements of which are usually between 20 and 30 cm. As a result, when an oscillating mirror is used for the uniaxial widening of the image, relatively high oscillation frequencies must be selected in order to achieve a uniaxial widening within the measuring time that is available for one bearing. In these oases, it may, therefore, be advantageous to arrange a focussing lens system in front of the oscillating mirror, so that the mass of the oscillating mirror or the size of the oscillating mirror as well as the oscillating amplitude may be kept low, permitting high oscillation frequencies to be achieved by means of low mechanical driving forces.

A particularly uncomplicated distorting device may also be constructed by arranging optical elements having surfaces that deviate from the rotational symmetry with respect to the optical axis. A device that contains optical elements of this type may, for example, be constructed in such a way that at least one cylinder lens or at least one cylinder mirror is provided. Curved surfaces of this type having rectilinear generatrices result in an exclusively uniaxial distortion, yielding the lowest loss of measuring sensitivity.

The device may be designed in such a way that, as the distorting device, an anamorphote IR objective or an afocal anamorphote IR lens system and an IR objective, such lens systems are generally disclosed in the patens to Jacobsen, U.S. 4509832, and Machida, U.S. 3990785. is used. In the case of such anamorphote Ir objectives or afocal anamorphote IR lens systems in combination with an IR objective, a single selected setting may result in the desired scanning width or the widening of the cone of vision over the axial length of the bearing without any additional adjusting operations. If an oscillating mirror is used, the arrangement can be optimized by selecting the reversal point of oscillation of the oscillating mirror so as to increase the probability that it will detect the hottest point of a bearing. The dwell time is the longest at the reversal point itself so that a weighted evaluation of the measured radiation can therefore take place by means of a corresponding setting of the oscillating mirror. In addition, oscillating mirrors have the advantage that, to a certain extent, they are self-cleaning.

In principle, devices of this type may also result in signals without any modulation because they respond sufficiently rapidly to a temperature change caused by a bearing that is moved into the cone of vision. A modulation of the radiation imaged on the detector by means of the lens system may be advantageous if, for example, the ambient temperature is to be evaluated as an additional signal. The reason is that, while continuous operations of rapid detectors of the afore-mentioned types cannot be easily evaluated, a modulated signal that is cyclically interrupted, for example, by means of a rotating slotted disk, in the phase in which the cone of vision does not encounter a bearing, can also furnish measuring values which will then correspond to the ambient temperature. When this type of modulator is used, not only can the ambient temperature be measured, but the signal, when a bearing enters the cone of vision, is correspondingly divided into partial signals. When an appropriate rotating modulator disk is used and measurements occur under real-time conditions, a temperature profile may be obtained over the bearing length particularly if a sufficiently fast rotation speed is selected to result in several measuring values within the measuring time that is available for one bearing. For this purpose, a rotating modulator disk is disposed in the path of the beam, the axis of rotation of which crosses, preferably at approximatley a right angle, the longitudinal axis of the widened image that was created by the distorting device. In this arrangement, the modulator disk is preferably situated between the distorting device and the heat radiation sensor.

In order to permit a defined measurement precisely at several points of the bearing, the system may be constructed such that several detector elements are situated next to each other in a single detector along the scanning direction of the modulator disk. These detector elements will then be struck sequentially by the radiated beam.

In a particularly uncomplicated way, this type of modulator disk may have radial slots, the width of each of which is smaller than the longitudinal axis of the widened image.

The development of the evaluating circuit or of the electronic system for the evaluation of the signals emitted by the detector may take place in a conventional way according to the state of the art.

In the following, the invention is explained in detail by means of embodiments that are shown diagrammatically in the drawing.

Figure 1:
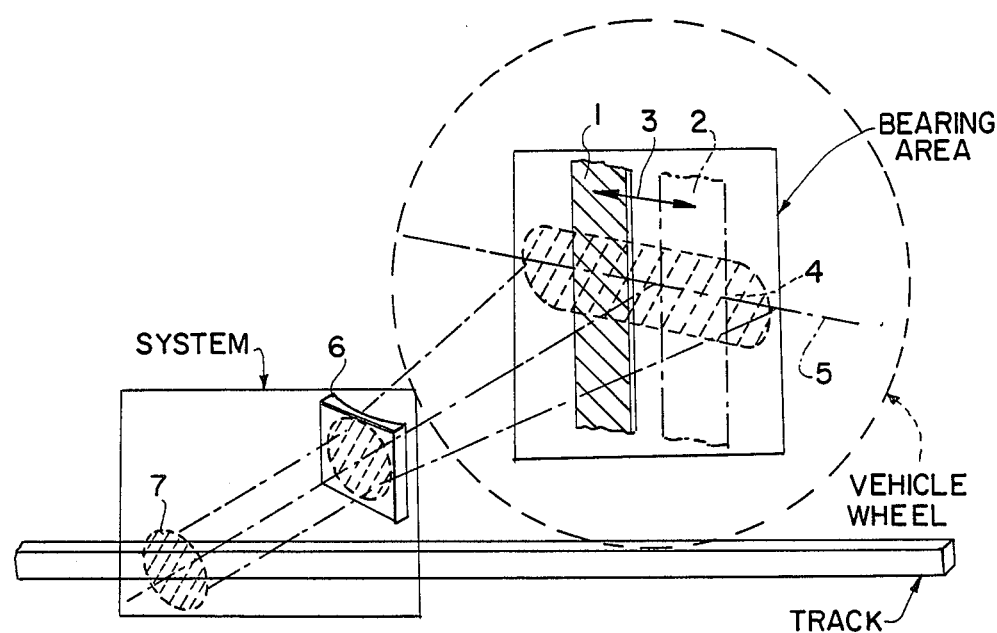
FIG. 1 is a first diagrammatic representation of a partial system including the distorting device.

In FIG. 1, subarea positions 1 and 2 of a bearing are shown over the length of the bearing which may move back and forth as a result of the sinusoidal path of the wheels in the direction of the double arrow 3 between positions 1 and 2. The measuring point is illustrated at point 3A for illustrative purposes. In order to ensure a reliable scanning of arbitrary positions of the bearing, the field of vision 4 of the system which is arranged in the vicinity of a track is uniaxially widened within the bearing area of a vehicle wheel situated on the track corresponding to the representation in FIG. 1 in the direction of the axis 5. For this purpose, a distorting optical device 6 is provided which may be a cylinder lens. This distorting optical device 6 produces a circular symmetrical beam form from the widened field of vision 4 as shown in beam cross section 7.

Figure 2:
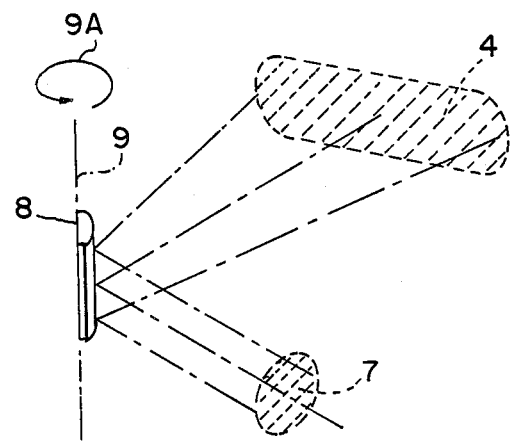
FIG. 2 is a perspective view of an alternative embodiment of a device according to FIG. 1.

In the alternative embodiment shown in FIG. 2, a mirror, particularly a cylinder mirror 8, is provided instead of the cylinder lens optical device 6. The beam cross-section again has the reference number 7. Depending on the construction of mirror 8, a more or less large widening of the cone of vision occurs and, instead of a stationary mirror having an essentially convex curvature, a plane or even concave oscillating mirror may be provided to replace mirror 8. In this case, the oscillation takes place around axis of rotation 9 as shown by arrow 9A, and, when a concave type of oscillating mirror is used, results depend on a focussing element which can project an image directly at a predetermined distance.

Figure 3:
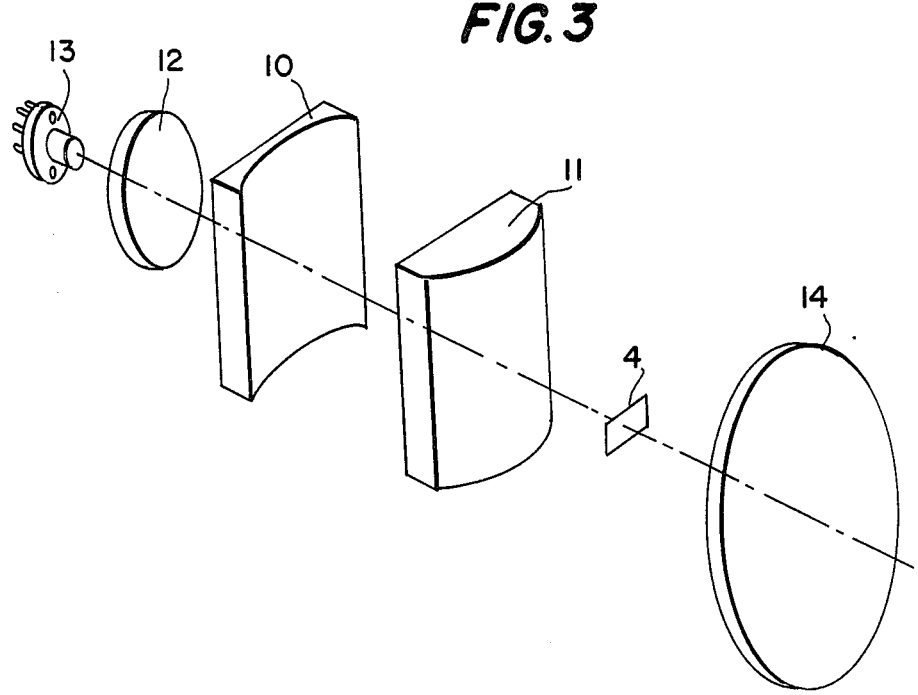
FIG. 3 is a perspective representation of an afocal anamorphote system that can be used according to the invention in connection with a lens system.

In the constructin shown in FIG. 3, cylinder lenses 10 and 11 are provided for the development of an afocal system, in which case the image is projected through an infrared lens 12 onto a detector 13 located behind it. The field of vision diagrammatically again has the reference number 4, in which case, the lens 12 may be constructed as an image field lens with an objective lens 14 inserted into the path of the beam between the bearing or the wheel running tread and the detector 13.

Figure 5:
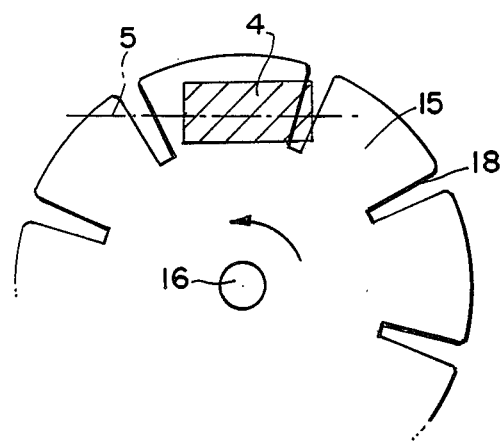
FIG. 5 is an enlarged view of a part of the modulator disk in the direction of its axis of rotation.
Figure 4:
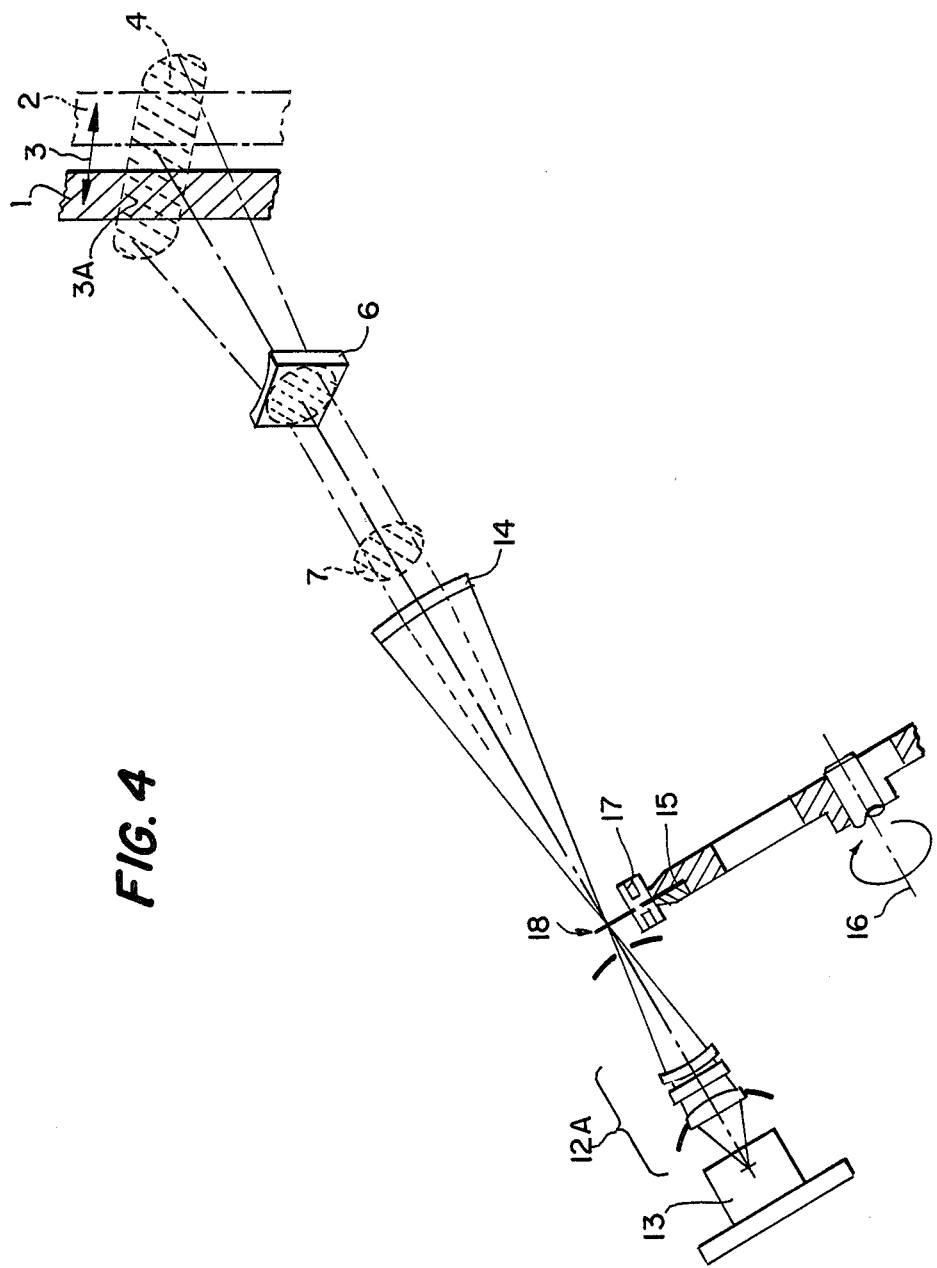
FIG. 4 is a diagrammatic representation of a device having a modulator disk.

In FIG. 4, a rotating modulator including a rotating modulator disk 15 is inserted into the path of the beam between the objective lens 14 and the imaging lens system 12A. The axis of rotation of the modulator disk 15 has the reference number 16. At the outer circumference of the modulator disk, radial slots are provided which cyclically interrupt the path of the rays corresponding to the selected speed of rotation. By means of a light barrier 17, a synchronization signal can be obtained that is proportional to the speed of rotation of the modulator disk. FIG. 5 is an enlarged representation of the modulator disk. The slots of the modulator disk 15 that extend in radial direction have the reference number 18, and by means of the arrangement of the modulator disk shown in FIG. 4, the field of vision 4 is now scanned sequentially through these slots 18, so that a plurality of different measuring values are obtained as different temperature levels are measured along the length of the widened field of vision 4 extending over axis 5. This type of a signal therefore results in a temperature profile over the length of the widened field of vision 4 and thus over the length of the bearing.

I claim:

1. A system for measuring the temperature of and detecting excessively heated wheel bearings and/or wheel tires of rail vehicles running on a track at a measuring point within a fixed field of vision wherein the system is stationarily arranged in the vicinity of the track and the position of the measuring point varies in a random manner over the length of the bearing along a known axis within a fixed field of vision, comprising:

heat sensing means for detecting infrared radiation and measuring the temperature of the wheel bearings;

infrared object lens means for scanning infrared radiation emitted from the measuring point and to produce an image thereof;

infrared focusing lens means for focusing scanned infrared radiation onto said heat sensing means; and afocal anamorphotic cylinder lens means for anamorphotically scanning the image produced by said infrared object lens means and for focusing the image into a beam having a substantially circular symmetrical shape on said infrared focusing lens means, wherein said afocal anamorphotic cylinder lens means widens the image in one axial direction to extend narrowly across an area at least equal to the fixed field of vision within which the position of the measuring point vaires 2. A system for measuring the temperature of and detecting excessively heated wheel bearings and/or wheel tires of rail vehicles running on a track at a measuring point within a fixed field of vision wherein the system is stationarily arranged in the vicinity of the track and the position of the measuring point varies in a random manner over the length of the bearing along a known axis within a fixed field of vision, comprising:
  heat sensing means for detecting infrared radiation and measuring the temperature of the wheel bearings;
  first lens means for anamorphotically scanning the fixed field of vision to produce an image and for focusing the image into a beam having a substantially circular symmetrical shape in the direction of said heat sensing means, wherein said first lens widens the image in one axial direction to extend narrowly across an area at least equal to the fixed field of vision within which the position of the measuring point varies;
  rotating modular disk means disposed between said heat sensisng means and said first lens means for generating a modulated signal to measure ambient temperature, wherein said rotating modular disk means includes radial slots, the width of each of which radial slots is less than the longitudinal axis of the widened image and wherein said rotating modulator disk means has an axis of rotation perpendicular to the axis along which the position of the measuring point varies;
  object lens means for focusing the beam generated by said first lens means onto the radial slots of said rotating modulator disk means; and
  second lens means for focusing an infrared component of the beam from said first lens means onto said heat sensing means.

3. A system for measuring the temperature of and detecting excessively heated wheel bearings and/or wheel tires of rail vehicles running on a track at a measuring point within a fixed field of vision wherein the system is stationarily arranged in the vicinity of the track and the position of the measuring point varies in a random manner over the length of the bearing along a known axis within a fixed field of vision, comprising:
  heat sensing means for detecting infrared radiation and measuring the temperature of the wheel bearings; and
  cylindrical lens means for anamorphotically scanning the fixed field of vision to produce an image and for focusing the image into a beam having a substantially circular symmetrical shape on said heat sensing means, wherein said cylindrical lens means widens the image in one axial direction to extend narrowly across an area at least equal to the fixed field of vision within which the position of the measuring point varies.

4. The system of claim 3, wherein said cylindrical lens means is a concave oscillating mirror.

5. A system for measuring the temperature of and detecting excessively heated wheel bearings and/or wheel tires of rail vehicles running on a track at a measuring point within a fixed field of vision wherein the system is stationarily arranged in the vicinity of the track and the position of the measuring point varies in a random manner over the length of the bearing along a known axis within the fixed field of vision, comprising:
  heat sensing means for detecting infrared radiation and measuring the temperature of the wheel bearings; and
  lens means for anamorphotically scanning the fixed field of vision to produce an image and for focusing the image into a beam having a substantially circular symmetrical shape on said heat sensing means, wherein said lens means widens the image in one axial direction to extend narrowly across an area at least equal to the fixed field of vision within which the position of the measuring point varies.

6. The system of claim 5, wherein said lens means is an oscillating mirror.

7. The system of claim 5, wherein said lens means includes at least one cylinder lens.

8. The system of claim 7, wherein said lens means includes an anamorphotic, infrared objective lens.

9. The system of claim 7, wherein said lens means includes an afocal anamorphotic infrared lens and an infrared objective lens.

10. The system of claim 5, wherein said lens means includes at least one cylinder mirror.

11. The system of claim 10, wherein said lens means includes an anamorphotic, infrared objective lens.

12. The system of claim 11, further comprising a rotating modular disk disposed between said heat sensing means and said lens means wherein said rotating modulator disk has an axis of rotation perpendicular to the axis along which the measuring point moves.

13. The system of claim 12, wherein said rotating modulator disk includes a plurality of detector element means for measuring temperatures at a plurality of measuring points, said detector element means being disposed adjacent to each other so as to sequentially intersect the beam focused by said lens means on said heat sensing means as said modulator disk rotates.

14. The system of claim 10, wherein said lens means includes an afocal, anamorphotic, infrared lens and an infrared objective lens.

15. The system of claim 14, further comprising a rotating modular disk disposed between said heat sensing means and said lens means wherein said rotating modulator disk has an axis of rotation perpendicular to the axis long which the measuring point moves and said modulator disk intersects the beam focused by said lens means on said heat sensing means.

16. The system of claim 15, wherein said rotating modulator disk includes a plurality of detector element means for measuring temperatures at a plurality of measuring points, said detector element means being disposed adjacent to each other so as to sequentially intersect the beam focused by said lens means on said heat sensing means as said modulator disk rotates.

17. The system of claim 16, wherein said rotating modulator disk includes at least two radial slots, the width of each of which slots is less than the distance in the fixed area across which the measuring point moves.

18. The system of claim 5, wherein said lens means includes an anamorphotic, infrared objective lens.

19. The system of claim 5, wherein said lens means includes an afocal anamorphotic infrared lens and an infrared objective lens.

20. The system of claim 5, further comprising a rotating modulator disk disposed between said heat sensing means and said lens means wherein said rotating modulator disk has an axis of rotation perpendicular to the axis along which the measuring point moves.

21. The system of claim 20, wherein said rotating modulator disk includes a plurality of detector element means for measuring temperatures at a plurality of measuring points, said detector element means being disposed adjacent to each other so as to sequentially intersect the beam focused by said lens means on said heat sensing means as said modulator disk rotates.

22. The system of claim 20, wherein said rotating modulator disk includes at least two radial slots, the width of each of which slots is less than the distance in the fixed area across which the measuring point moves.

* * * * *